(12) United States Patent
Feliss et al.

(10) Patent No.: US 8,085,488 B2
(45) Date of Patent: *Dec. 27, 2011

(54) PREDICTING OPERATIONAL PROBLEMS IN A HARD-DISK DRIVE (HDD)

(75) Inventors: Norbert A. Feliss, Aptos, CA (US); Donald Ray Gillis, San Jose, CA (US); Ferdinand Hendriks, Morgan Hill, CA (US); Charles Allan Brown, San Jose, CA (US)

(73) Assignee: Hitachi Global Storage Technologies Netherlands B.V. (NL)

( * ) Notice: Subject to any disclaimer, the term of this patent is extended or adjusted under 35 U.S.C. 154(b) by 258 days.

This patent is subject to a terminal disclaimer.

(21) Appl. No.: 12/549,135

(22) Filed: Aug. 27, 2009

(65) Prior Publication Data

US 2011/0051582 A1 Mar. 3, 2011

(51) Int. Cl.
G11B 33/14 (2006.01)
(52) U.S. Cl. ........................ 360/69; 360/97.02
(58) Field of Classification Search .................. None
See application file for complete search history.

(56) References Cited

U.S. PATENT DOCUMENTS

| | | | |
|---|---|---|---|
| 5,030,260 A | 7/1991 | Beck et al. | |
| 5,447,695 A | 9/1995 | Brown | |
| 5,764,430 A * | 6/1998 | Ottesen et al. | 360/75 |
| 6,144,178 A * | 11/2000 | Hirano et al. | 318/476 |
| 6,587,301 B1 * | 7/2003 | Smith | 360/75 |
| 6,646,821 B2 * | 11/2003 | Bernett et al. | 360/75 |
| 6,683,747 B2 * | 1/2004 | Bernett | 360/97.02 |
| 6,700,726 B1 * | 3/2004 | Gillis et al. | 360/75 |
| 6,785,089 B2 * | 8/2004 | Bernett et al. | 360/69 |
| 6,819,517 B2 * | 11/2004 | Fioravanti et al. | 360/75 |

(Continued)

FOREIGN PATENT DOCUMENTS

WO 02065474 A2 8/2002

(Continued)

OTHER PUBLICATIONS

Tim Bethke, "Controlling In-drive Contamination," article on website: http://cr.pennnet.com/articles/article_display.cfm?article_id=40976, printed Aug. 27, 2009.

(Continued)

*Primary Examiner* — Hoa T Nguyen
*Assistant Examiner* — James L Habermehl
(74) *Attorney, Agent, or Firm* — Mahamedi Paradice Kreisman LLP; Christopher J. Brokaw

(57) ABSTRACT

A method and apparatus for determining the likelihood that a hard-disk drive (HDD) will experience an imminent error in operation is provided. The HDD comprises a differential pressure sensor capable of measuring the difference in the pressure between the interior and the exterior of the enclosure. The differential pressure sensor may reside in a breather filter covering an air passage within the enclosure. The HDD also comprises a risk assessment component capable of (a) determining an expression of how likely it is that the HDD will experience an imminent error in operation based, at least in part, upon the difference in pressure measured by the pressure sensor, and (b) communicating the expression to a user of the HDD. The HDD may optionally comprise one or more of an atmospheric pressure sensor, a particle counter, and a chemical vapor sensor which may be used by the risk assessment component.

22 Claims, 10 Drawing Sheets

U.S. PATENT DOCUMENTS

| | | |
|---|---|---|
| 6,958,876 B2 | 10/2005 | Feliss et al. |
| 7,064,920 B2 | 6/2006 | Fujiwara et al. |
| 7,271,975 B2 * | 9/2007 | Shimizu et al. .................. 360/75 |
| 7,274,534 B1 | 9/2007 | Choy et al. |
| 7,362,540 B2 * | 4/2008 | Repphun et al. ............ 360/97.02 |
| 7,466,514 B2 * | 12/2008 | Brown et al. .............. 360/97.02 |
| 7,511,914 B2 * | 3/2009 | Hiller et al. ...................... 360/75 |
| 7,555,947 B2 * | 7/2009 | Kasajima ......................... 360/75 |
| 7,630,160 B2 * | 12/2009 | Kurita et al. ..................... 360/69 |
| 7,733,595 B2 * | 6/2010 | Lucas et al. ...................... 360/75 |
| 7,738,211 B2 * | 6/2010 | Oyamada et al. ............... 360/75 |
| 7,808,740 B2 * | 10/2010 | Tanabe ............................. 360/75 |
| 7,852,595 B2 * | 12/2010 | Kitahori et al. ................. 360/75 |
| 7,924,527 B2 * | 4/2011 | Aoyagi et al. ............. 360/97.02 |
| 2008/0174910 A1 * | 7/2008 | Hirono et al. .............. 360/97.02 |
| 2008/0212237 A1 | 9/2008 | Uefune et al. |
| 2009/0288491 A1 * | 11/2009 | Suzuki et al. .............. 360/97.02 |
| 2011/0038076 A1 * | 2/2011 | Hayakawa et al. ........ 360/97.02 |
| 2011/0051577 A1 | 3/2011 | Feliss |

FOREIGN PATENT DOCUMENTS

| | | |
|---|---|---|
| WO | 03007302 A1 | 1/2003 |

OTHER PUBLICATIONS

"Mechanics," article on Economic Expert.com website: http://www.economicexpert.com/a/Hard:disk.html, printed Aug. 27, 2009.

* cited by examiner

PREDICTING OPERATIONAL PROBLEMS IN A HARD-DISK DRIVE (HDD)

RELATED APPLICATION DATA

This application is related to U.S. patent Ser. No. 12/549,166, entitled Using an Atmospheric Pressure Sensor in a Hard-Disk Drive (HDD), filed by Norbert Feliss, et al. on the same day as the present application, the contents

FIELD OF THE INVENTION

Embodiments of the invention relate to predicting an operational problem in a hard-disk drive (HDD).

BACKGROUND OF THE INVENTION

The operation of certain computer equipment can be negatively affected by the presence of environmental hazards, such as airborne contaminants. To prevent this harm from occurring, some sensitive equipment may be housed in an enclosure that is designed to keep out airborne contaminants.

An example of a piece of sensitive equipment housed within a protective enclosure is a hard-disk drive (HDD). An HDD is a non-volatile storage device, which is housed in a protective enclosure, that stores digitally encoded data on one or more circular platters having magnetic surfaces. When an HDD is in operation, each platter is rapidly rotated by a spindle system. Data is read from and written to a platter using a read/write head which is positioned over a specific location on a platter by an actuator.

A read/write head uses a magnetic field to read data from and write data to the surface of a platter. As a magnetic dipole field decreases rapidly with distance from a magnetic pole, the space between a read/write head and the surface of a platter must be tightly controlled. To provide a uniform distance between a read/write head and the surface of a platter, an actuator relies on air generated by a self-acting air bearing to support the read/write heads at the proper distance away from the surface of a platter while the platter rotates. A read/write head therefore is said to "fly" over the surface of a platter. That is, the air pulled along by a spinning platter forces the head away from the surface of the platter. When a platter stops spinning, a read/write head must either "land" on the platters or be pulled away.

Very small airborne particles, such as the size of 10 nm to 1000 nm (1 micron), may adhere to the air bearing surfaces of either a read/write head or deposit on the surface of the magnetic platters (disk stack). When the surface of either a read/write head or a platter becomes attached to airborne particles, it is more likely that a read/write head may not read data properly or may scrape across the surface of a platter, which could grind away the thin magnetic film of the platter and cause data loss and potentially render the HDD inoperable.

It may be necessary to equalize the pressure between the interior and the exterior of the HDD in certain situations, such as when the hard-disk drive is turned on or turned off, when the HDD is brought to a different elevation (e.g., from sea level to a mountain top), or when the temperature of the HDD is much different than the ambient temperature. To equalize the pressure between the interior and the exterior of the enclosure, the enclosure has a small opening (an "air passage") located in the cover of the HDD that allows air to travel between the interior and the exterior of the enclosure. The air passage is covered by a filter (referred to as a "breather filter") that filters the air to prevent any airborne particles outside of the enclosure from entering the interior of the enclosure. When the hard-disk drive is in a steady state (i.e., after it has been turned on or off for a period of time), there should be no air flow through the air passage covered by the breather filter, although mass diffusion will still occur.

SUMMARY OF THE INVENTION

Techniques are provided for predicting an operational problem in a hard-disk drive (HDD). Embodiments of the invention predict an operational problem by detecting a leak in the enclosure of the HDD caused by an unintentional opening in the enclosure. The presence of the leak within the enclosure of the HDD indicates that harmful airborne particles or chemical vapors from the exterior of the enclosure have likely entered the interior of the HDD. Such harmful airborne particles or chemical vapors may cause the HDD to crash or otherwise experience an operational problem. Chemical vapors that may leak into the interior of an HDD are typically hydrocarbon in nature, such as methane gas to gasoline as well as siloxane (poly-dimethylsiloxane) gas. A vapor detector employed by an HDD may be selectively tailored and manufactured to detect a range of hydrocarbon and siloxane (poly-dimethylsiloxane) gases. Embodiments of the invention may inform a user of the HDD of the presence of the leak so that the user may take appropriate action, such as backing up data stored on the HDD or servicing the HDD.

In an embodiment, the presence of a leak within the enclosure of the HDD may be detected by measuring the drop in pressure across the breather filter of the HDD. A pressure sensor (referred to herein as a "differential pressure sensor") capable of measuring the drop in pressure across the breather filter may be positioned within the air passage covered by the breather filter, as shown in FIG. 6. The flow of air through the breather filter can be detected with back-to-back matched thermistors which operate in a self heating mode. Back-to-back matched thermistors may be implemented using MEMS technology, which includes pressure sensors in surface mount packages, fully calibrated, and amplified or having digital output versions. The back-to-back thermistors may detect the flow of air through the breather filter, direction of the flow of air through the breather filter, and the difference in pressure across the breather filter. If there is no leak within the enclosure of the HDD, then there will be no drop in pressure across the breather filter. However, if there is a leak within the enclosure of the HDD, then there will be a drop in pressure across the breather filter.

Certain embodiments of the invention may also employ a particle counter within the interior of the enclosure to count the number of airborne particles present within the enclosure. For example, the particle counter may be used to count the number of airborne particles within the enclosure of the HDD since being manufactured. In this way, the particle counter can identify whether the number of airborne particles has increased since a prior point in time, such as the time of manufacture of the HDD. The differential pressure sensor and the particle counter may be used in combination by embodiments of the invention to assess the risk posed by a leak.

Other embodiments of the invention may employ a chemical vapor sensor within the interior of the enclosure to measure the vapor concentration present within the enclosure. The chemical vapor sensor may be used to measure the total buildup of chemical vapors within the interior of the HDD since the time of manufacture of the HDD. The differential pressure sensor, particle counter, and chemical vapor sensor may be used in any combination by embodiments of the invention to assess the risk posed by a leak.

Further embodiments of the invention may employ an atmospheric pressure sensor, which is a sensor which can determine the altitude at which the HDD is presently located. For example, the atmospheric pressure sensor may determine whether the HDD is presently located at sea level or at a high elevation. When the HDD is at a relatively high elevation, the risk posed by a leak is greater because the read/write head flies closer to the surface of the disk than when the HDD is at sea level. The differential pressure sensor, particle counter, chemical vapor sensor, and atmospheric pressure sensor may be used in any combination by embodiments of the invention to assess the risk posed by the leak.

In an embodiment of the invention, when an HDD is turned on, a risk assessment component within the HDD checks data recorded by one or more of the differential pressure sensor, the particle counter, the chemical vapor sensor, and the atmospheric pressure sensor to ascertain whether there is a leak in the enclosure of the HDD and to assess the risk posed by any such leak. Thereafter, the risk assessment component may communicate the assessment of the risk to a user of the HDD.

Embodiments discussed in the Summary of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION OF THE INVENTION

Approaches for predicting an operational problem in a hard-disk drive (HDD) are described. In the following description, for the purposes of explanation, numerous specific details are set forth in order to provide a thorough understanding of the embodiments of the invention presented herein. It will be apparent, however, that the embodiments of the invention presented herein may be practiced without these specific details. In other instances, well-known structures and devices are shown in block diagram form in order to avoid unnecessarily obscuring the embodiments of the invention presented herein.

How Leaks can Occur within an HDD

A hard-disk drive (HDD) may experience a leak by the introduction of an unintended hole or opening in the enclosure of the HDD. An unintended hole or opening may occur in the enclosure of the HDD in the course of manufacturing or by the HDD experiencing a bump. A sudden force asserted against the HDD may disrupt an elastomeric filter or seal around a screw, which may introduce a leak.

Leaks can occur in a variety of locations within the enclosure of the HDD. For example, an unintended hole or opening may be present where the cover attaches to the base, where the motor is attached to the base casting, where the seal attaches to the base casting, around screws or screw holes, near the seal between the cover servo-write access hole that is used for the push/pull level of a servo writer, near the seal between the particle count hole and the cover, and any small crack or hole in the HDDs base casting or cover caused during manufacturing. These locations are merely illustrative of where an unintended hole or opening may occur, and are not meant to exhaustively identify all locations where a leak in an HDD may occur.

A potential leak at the mating surface of the cover may be caused by damage to the cover gasket or by a defect in the casting mating surface of the HDD that affects the main cover seal. Seal leaks can be caused after manufacture or in use by damage to the seal itself. Seals may be made thick and very robust but to do so affects their ability to be supplied on a roll for automatic manufacturing. In addition, thick seals make it hard to manufacture on high speed machines. Another leak path that is observed in HDDs is caused by the pressure of the electrical card on the signal bracket, especially if there is a translational and rotational mechanical shock.

Figure 4:
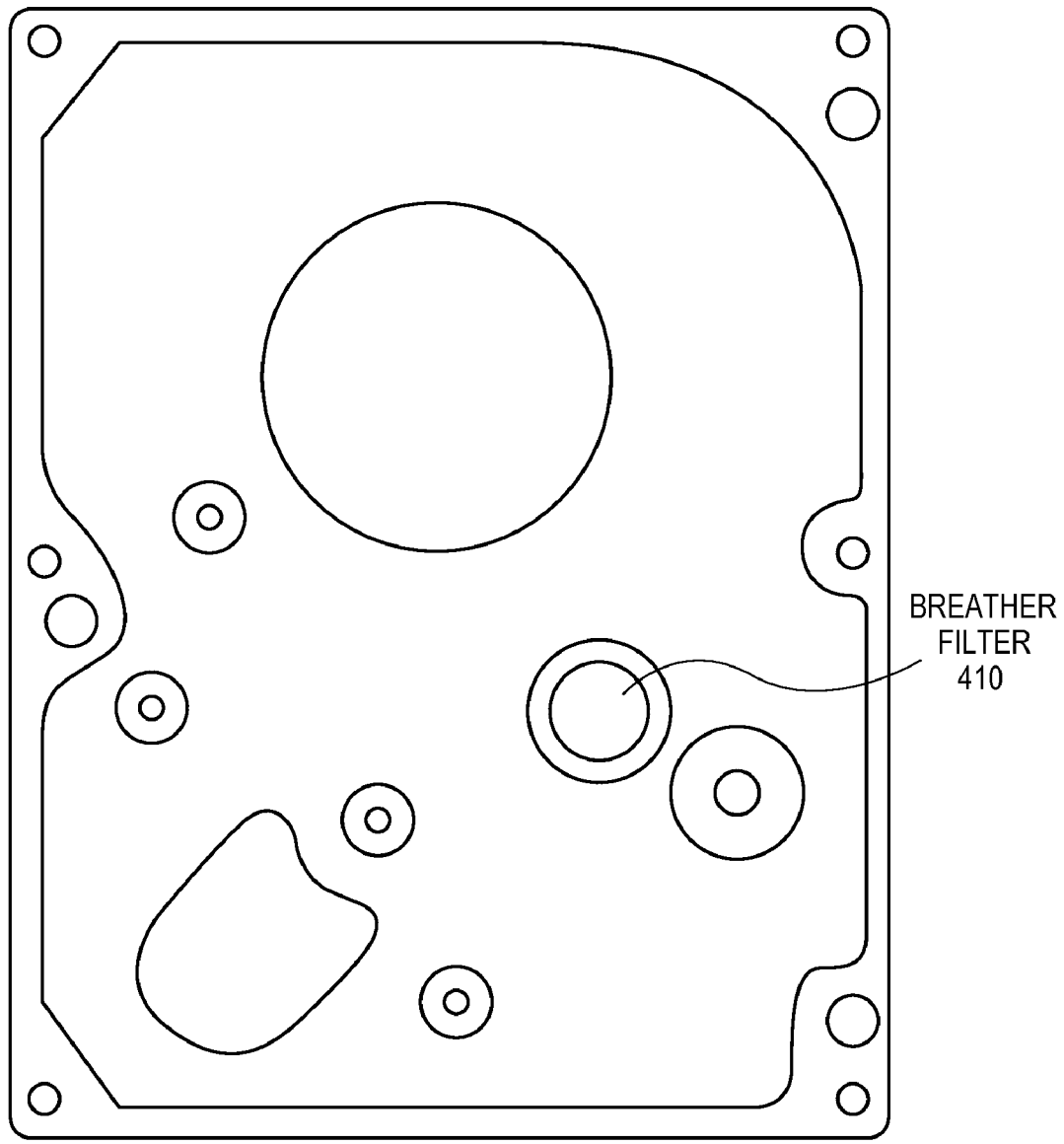
FIG. 4 is an illustration of a cover of an HDD that comprises a breather filter according to an embodiment of the invention.
Figure 5:
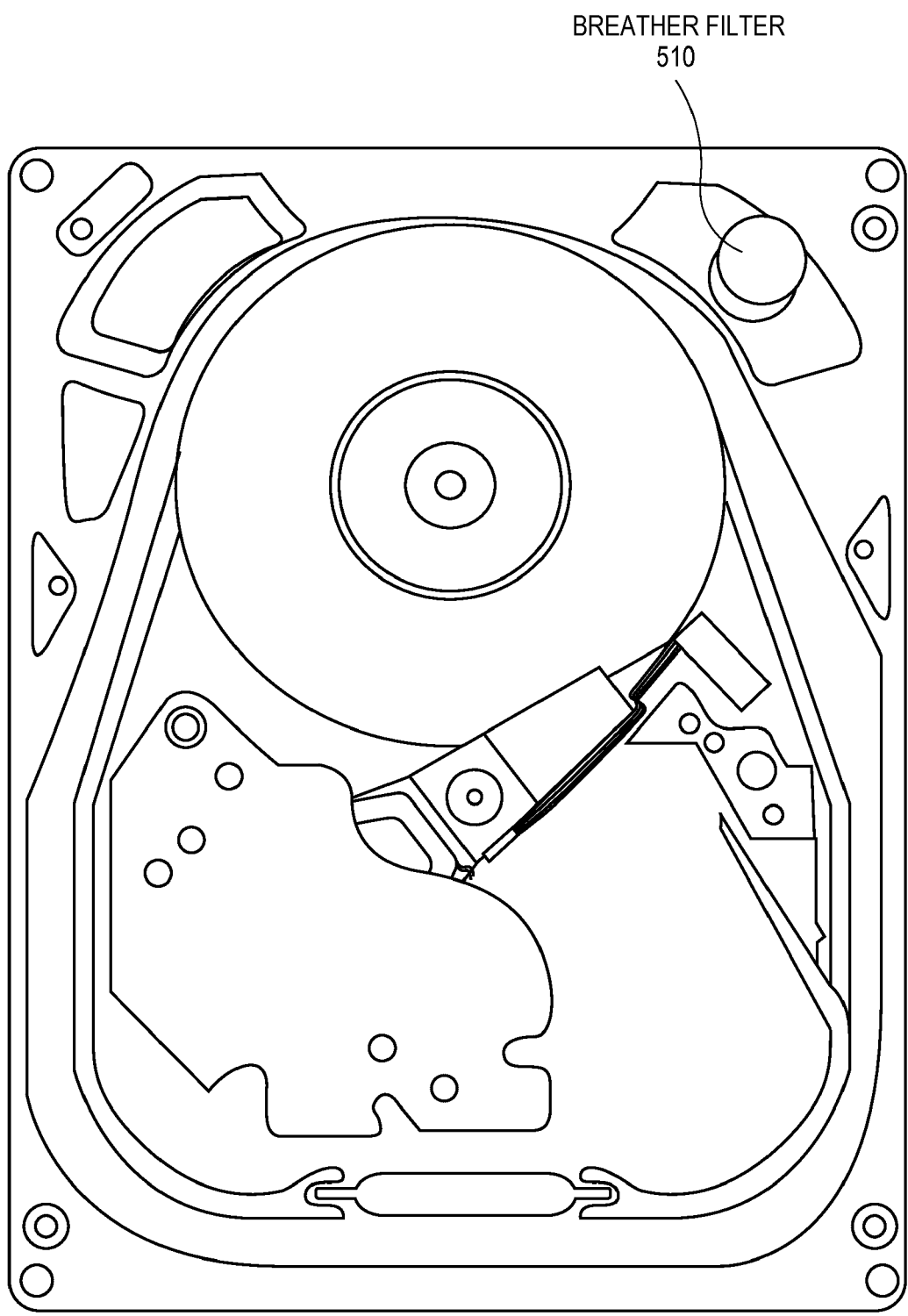
FIG. 5 is an illustration of a base casting of an HDD that comprises a breather filter according to an embodiment of the invention.

When an HDD is in operation, the air inside the enclosure of the HDD circulates due to the spinning of the platters. The circulation of the air within the protective enclosure exerts pressure upon the interior surface of the enclosure. This pressure varies based upon location. The pressure exerted by the circulating air upon the interior surface of the enclosure increases with distance from the center of the spinning platters. Thus, when the drive is in operation, the pressure exerted upon the interior surface of the enclosure near the center of the enclosure is less than the pressure exerted upon the interior surface of the enclosure near the outer edge of the spinning platters. The average pressure in the HDD is determined by the location of the breather filter. An optimum location of the breather filter is at the center of the rotating disk pack. However, design or manufacturing constraints may prohibit this location for the breather filter. The breather filter is typically placed near the periphery of the disk pack, either located in the cover or inside the base casting. For example, non-limiting, illustrative locations of a breather filter are depicted in FIGS. 4 and 5. FIG. 4 is an illustration 400 of a cover of an HDD that comprises a breather filter 410 according to an embodiment of the invention. FIG. 5 is an illustration 500 of a base casting of an HDD that comprises a breather filter 510 according to an embodiment of the invention.

The enclosure of an HDD typically includes one intentional hole. This intentional hole is used to equalize the pressure between the interior and the exterior of the enclosure when the HDD is turned on or turned off. To prevent airborne particles from entering the interior of the enclosure, the intentional hole is covered by a breather filter, which filters the air flowing into the interior of the enclosure of the HDD to prevent any airborne particles from entering into the interior of the enclosure of the HDD. If there are no unintentional holes or openings in the enclosure of the HDD, then no air flows through the breather filter when the HDD is in a steady state. The HDD is in a steady state after the HDD has been turned on or off for a certain period of time. The flow of air through the breather filter is also affected by thermal effects, such as the heating and cooling which occurs when the HDD is turned on and off which equalizes the pressure inside the drive to the outside ambient pressure.

However, if there are one or more unintentional holes or openings in the enclosure of the HDD, then there will be a flow of air from a hole or opening in a location at a relatively higher pressure to another hole or opening in a location at a relatively lower pressure. Any unfiltered air that flows into the interior of the enclosure of the HDD may carry airborne particles or chemical vapors that are harmful to the operation of the HDD. Adding additional airborne particles or chemical vapors into the interior of the HDD may result in data loss and may potentially render the HDD inoperable. As a result, it would be desirable for a user to know whether or not his or her HDD is experiencing a leak so that the user could take appropriate action (such as backing up data on the HDD or servicing the HDD) prior to the HDD losing data or becoming inoperable.

Having described how leaks may be introduced into an HDD, an illustrative HDD, according to an embodiment of the invention, which is capable of a detecting a leak and assessing the risk caused thereby, shall now be presented.

Physical Description of Illustrative Embodiments of the Invention

Figure 1:
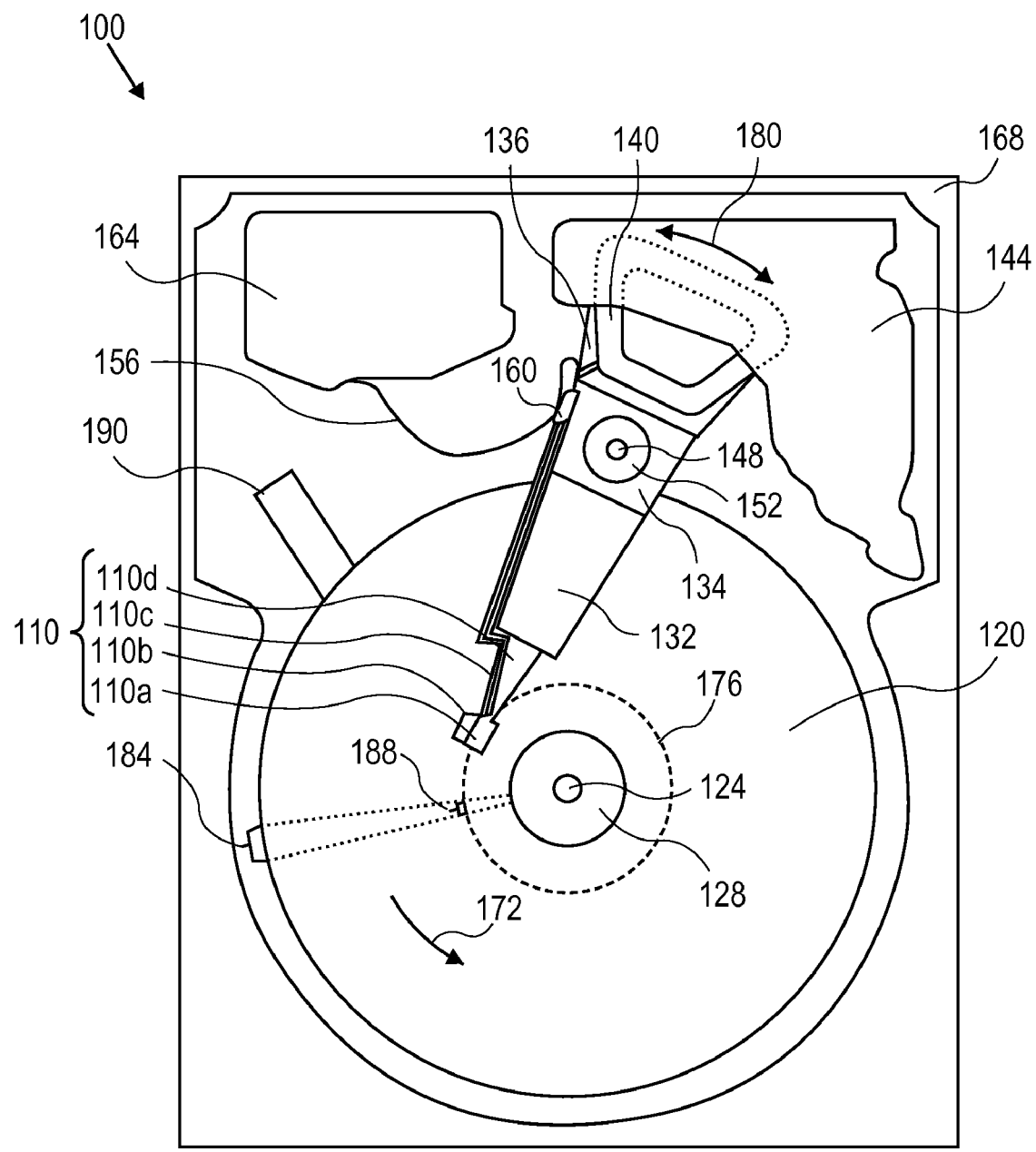
FIG. 1 is an illustration of a plan view of an HDD according to an embodiment of the invention.

With reference to FIG. 1, in accordance with an embodiment of the present invention, a plan view of a HDD 100 is shown. FIG. 1 illustrates the functional arrangement of components of the HDD including a slider 110*b* including a magnetic-recording head 110*a*. The HDD 100 includes at least one HGA 110 including the head 110*a*, a lead suspension 110*c* attached to the head 110*a*, and a load beam 110*d* attached to the slider 110*b*, which includes the head 110*a* at a distal end of the slider 110*b*; the slider 110*b* is attached at the distal end of the load beam 110*d* to a gimbal portion of the load beam 110*d*. The HDD 100 also includes at least one magnetic-recording disk 120 rotatably mounted on a spindle 124 and a drive motor (not shown) attached to the spindle 124 for rotating the disk 120. The head 110*a* includes a write element, a so-called writer, and a read element, a so-called reader, for respectively writing and reading information stored on the disk 120 of the HDD 100. The disk 120 or a plurality (not shown) of disks may be affixed to the spindle 124 with a disk clamp 128. The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown); the armature 136 of the VCM is attached to the carriage 134 and is configured to move the arm 132 and the HGA 110 to access portions of the disk 120 being mounted on a pivot-shaft 148 with an interposed pivot-bearing assembly 152.

With further reference to FIG. 1, in accordance with an embodiment of the invention, electrical signals, for example, current to the voice coil 140 of the VCM, write signal to and read signal from the PMR head 110*a*, are provided by a flexible cable 156. Interconnection between the flexible cable 156 and the head 110*a* may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, in accordance with an embodiment of the invention, other electronic components (not shown), including a disk controller and servo electronics including a digital-signal processor (DSP), provide electrical signals to the drive motor, the voice coil 140 of the VCM and the head 110*a* of the HGA 110. The electrical signal provided to the drive motor enables the drive motor to spin providing a torque to the spindle 124 which is in turn transmitted to the disk 120 that is affixed to the spindle 124 by the disk clamp 128; as a result, the disk 120 spins in a direction 172. The spinning disk 120 creates a cushion of air that acts as an air-bearing on which the air-bearing surface (ABS) of the slider 110*b* rides so that the slider 110*b* flies above the surface of the disk 120 without making contact with a thin magnetic-recording medium of the disk 120 in which information is recorded. The electrical signal provided to the voice coil 140 of the VCM enables the head 110*a* of the HGA 110 to access a track 176 on which information is recorded. Thus, the armature 136 of the VCM swings through an arc 180 which enables the HGA 110 attached to the armature 136 by the arm 132 to access various tracks on the disk 120. Head 110*a* may rest upon load/unload platform 190 when head 110*a* is not in use.

Information is stored on the disk 120 in a plurality of concentric tracks (not shown) arranged in sectors on the disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110*a* of the HGA 110 reads the servo-burst-signal pattern which provides a position-error-signal (PES) to the servo electronics, which controls the electrical signal provided to the voice coil 140 of the VCM, enabling the head 110*a* to follow the track 176. Upon finding the track 176 and identifying a particular sectored track portion 188, the head 110*a* either reads data from the track 176 or writes data to the track 176 depending on instructions received by the disk controller from an external agent, for example, a microprocessor of a computer system. Embodiments of the invention also encompass HDD 100 that includes the HGA 110, the disk 120 rotatably mounted on the spindle 124, the arm 132 attached to the HGA 110 including the slider 110*b* including the head 110*a*.

Figure 2:
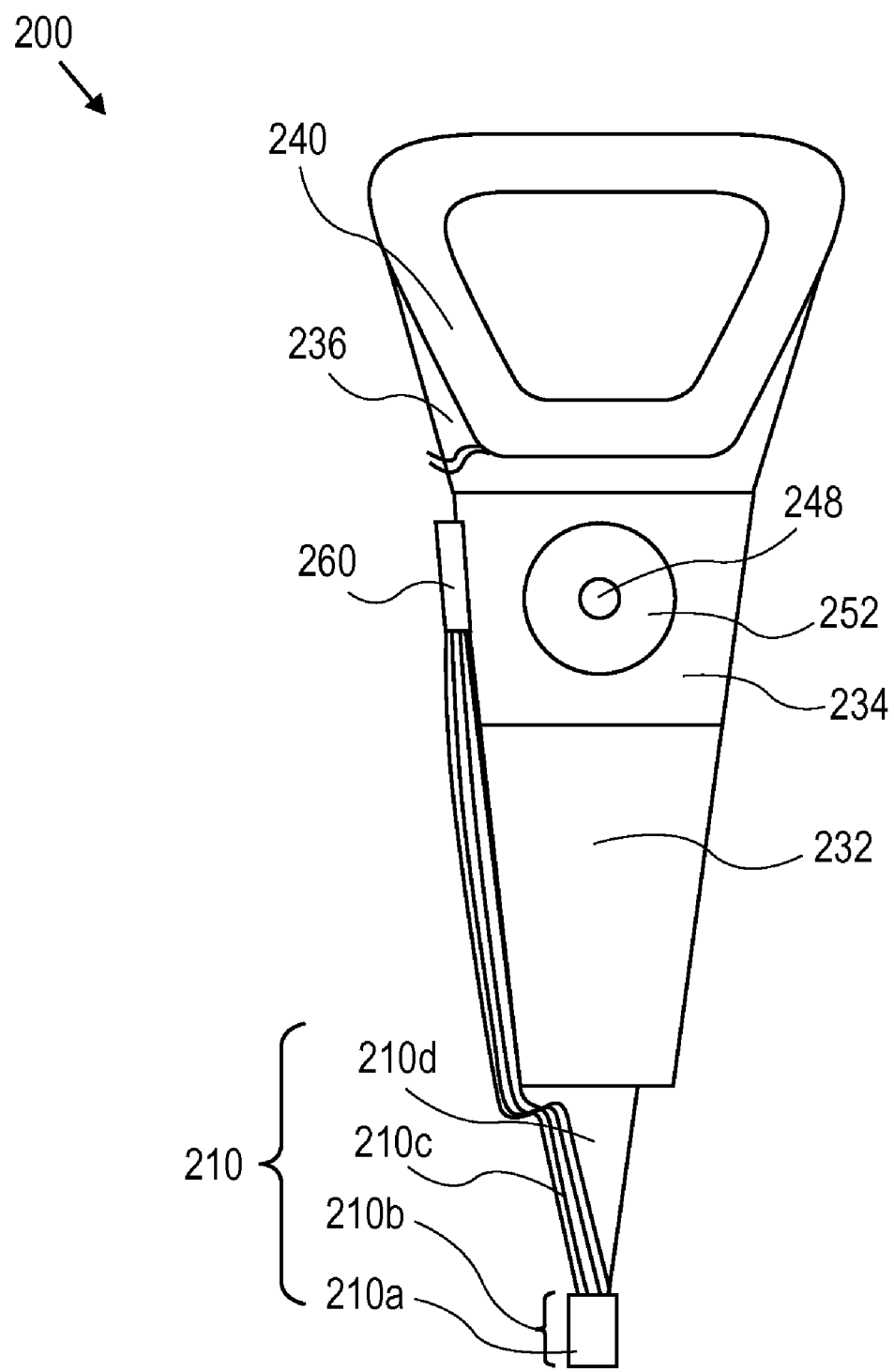
FIG. 2 is an illustration of a plan view of a head-arm-assembly (HAA) according to an embodiment of the invention.

With reference now to FIG. 2, in accordance with an embodiment of the present invention, a plan view of a head-arm-assembly (HAA) 200 including the HGA 210 is shown. FIG. 2 illustrates the functional arrangement of the HAA with respect to the HGA 210. The HAA includes the arm 232 and HGA 210 including the slider 210b including the head 210a. The HAA is attached at the arm 232 to the carriage 234. In the case of an HDD having multiple disks, or platters as disks are sometimes referred to in the art, the carriage 234 is called an "E-block," or comb, because the carriage is arranged to carry a ganged array of arms that gives it the appearance of a comb. As shown in FIG. 2, the armature 236 of the VCM is attached to the carriage 234 and the voice coil 240 is attached to the armature 236. The AE 260 may be attached to the carriage 234 as shown. The carriage 234 is mounted on the pivot-shaft 248 with the interposed pivot-bearing assembly 252.

Figure 6:
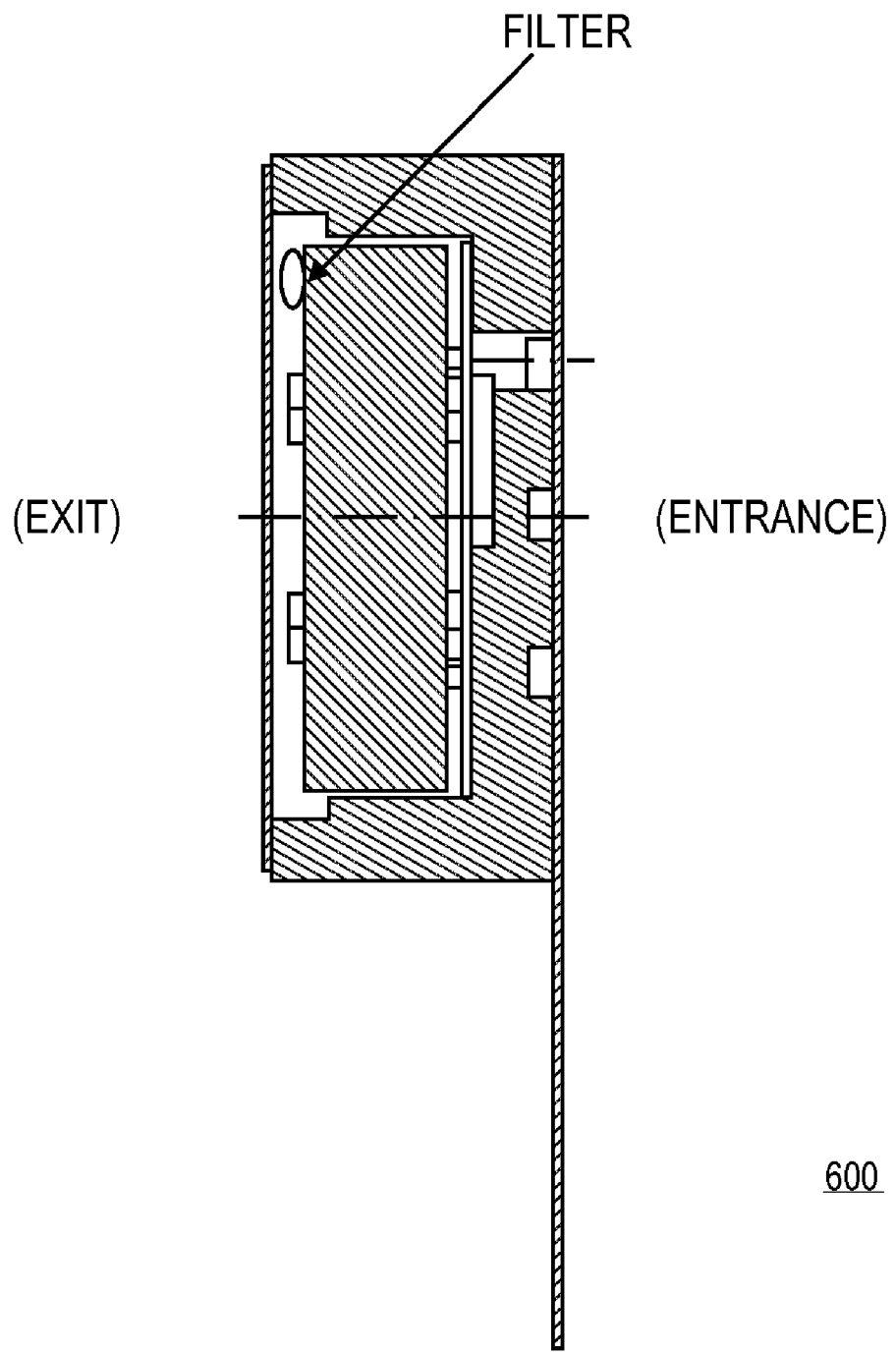
FIG. 6 is an illustration of a pressure sensor located within the air flow path of a breather filter according to an embodiment of the invention.
Figure 7:
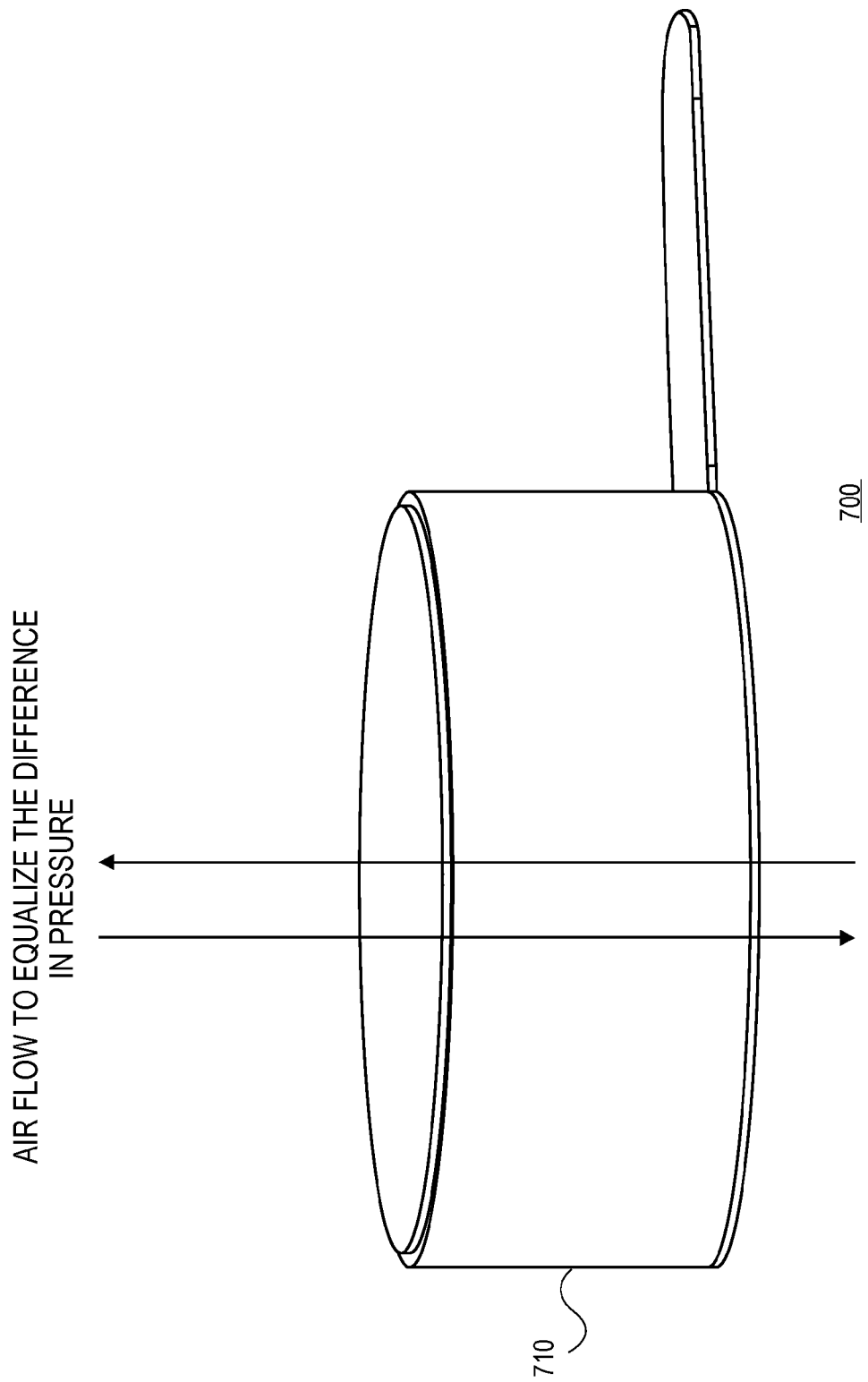
FIG. 7 is an illustration of the flow of air through a breather filter according to an embodiment of the invention.
Figure 8:
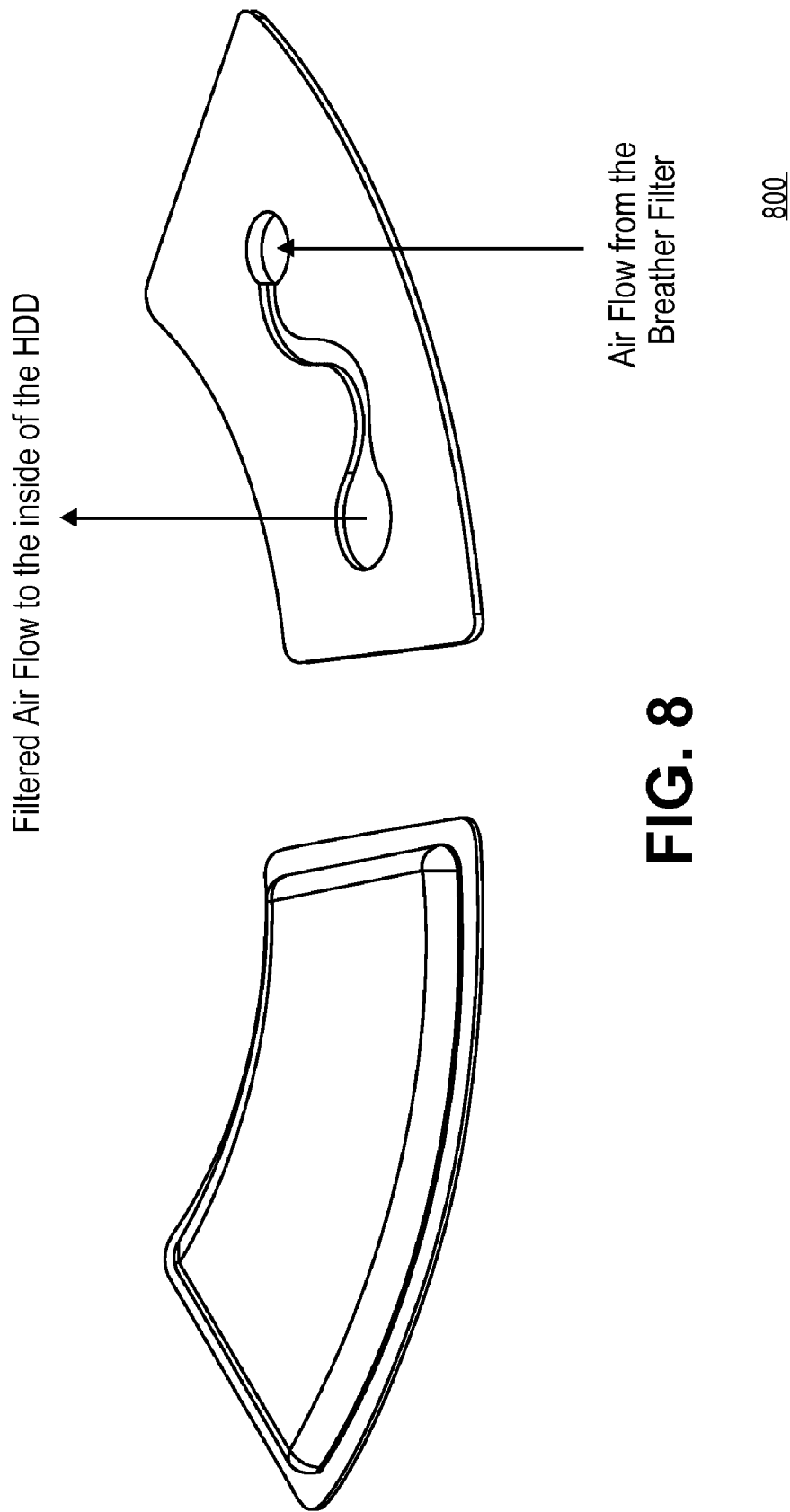
FIG. 8 is a cross-sectional view of a cover comprising a breather filter with a diffusion channel according to an embodiment of the invention.

In an embodiment, the enclosure of HDD 100 contains an air passage (such as depicted in FIGS. 6-8) that allows air to flow between the interior of the enclosure and the exterior of the enclosure. This air passage is used to equalize the pressure between the interior and the exterior of the enclosure when HDD 100 is turned on or turned off. The air passage is covered by a breather filter, which is a filter which prevents any airborne particles from entering the interior of the enclosure of HDD 100. FIG. 7 is an illustration of the flow of air through an air passage 710 covered by a breather filter according to an embodiment of the invention.

The air passage and breather filter may be positioned anywhere in the enclosure of HDD 100; however, it may be advantageous to position the breather filter as close as possible to the center of HDD 100 to minimize the portions of the interior of HDD 100 which are at a lower pressure than the outside of the enclosure of HDD 100. Other locations for the breather filter besides the center of HDD 100 may also be suitable for the detection of a leak, and the location of the breather filter need only be at a pressure point that is lower than the probable location of a leak.

The air passage may be implemented using a variety of different shapes. For example, the air passage may be relatively straight, as shown by FIG. 7. Alternately, the air passage may be non-linear. To illustrate, consider FIG. 8, which is a cross-sectional view of a cover comprising a breather filter with a diffusion channel according to an embodiment of the invention. As shown by FIG. 8, the air passage in the cover of FIG. 8 is non-linear, and the flow of air through the air passage follows a curvy path from the opening to the exterior of HDD 100 to the opening of the interior of HDD 100.

In an embodiment, HDD 100 may contain a differential pressure sensor (as depicted by FIG. 6) capable of measuring a difference in pressure between the interior of the enclosure of HDD 100 and the exterior of the enclosure of HDD 100. The differential pressure sensor may be located anywhere in which this difference in pressure may be measured. For example, in an embodiment, the pressure sensor is located within the air passage covered by breather filter. In an embodiment, the structure of the breather filter and the pressure sensor enables the breather filter and the pressure sensor to be located anywhere in a cover or a base casting of HDD 100.

In another embodiment, HDD 100 may contain an atmospheric pressure sensor. An atmospheric pressure sensor is a sensor which can determine the altitude at which HDD 100 is presently located. For example, the atmospheric pressure sensor may determine the whether HDD 100 is presently located at sea level or at a high elevation. The atmospheric pressure sensor may be used to determine the change in altitude of HDD 100 and to allow HDD 100 to make adjustments to optimize the head/disk spacing via the TFC heater element to compensate for changes in head/disk separation or flying height based on the current altitude of HDD 100. The pressure sensor depicted by FIG. 6 may correspond to an atmospheric pressure sensor in an embodiment. The atmospheric pressure sensor may be located in any location within HDD 100, including the electrical printed circuit board (PCB) of HDD 100.

In an embodiment, the differential pressure sensor provides differential pressure data that describes changes, over a period of time, in the difference in pressure between the interior of the enclosure of HDD 100 and the exterior of the enclosure of HDD 100. This differential pressure data may be stored on the disk of the HDD or in flash memory (electrical card of the HDD). In such an embodiment, HDD 100 may comprise flash memory (not depicted) within the interior of the enclosure of HDD 100. The differential pressure data recorded by the pressure sensor may be stored in the flash memory.

Atmospheric pressure data, which describes the current elevation of HDD 100, may also be recorded from the atmospheric pressure sensor to track the change in altitude of HDD 100. In an embodiment, atmospheric pressure may identify the altitude of HDD 100 at different points in time. In an embodiment, atmospheric pressure data may be recorded in any location as differential pressure data.

In an embodiment, based on the atmospheric pressure data, HDD 100 may perform a change in the TFC settings of all the heads to compensate for the decrease in head/disk separation typically experienced when going from sea-level to a high altitude. For example, if at sea-level the head/disk separation is at 10 nanometers, then when HDD 100 is moved to an altitude of 3300 meters a decrease of 2 nanometers in the distance between the head and the disk is usually observed. To compensate, the TFC settings may be adjusted to for the 2 nanometer drop in the head/disk separation. Alternatively, when moving HDD 100 from an altitude of 3300 meters back to sea-level, the TFC settings of the heads may be adjusted to effect a 2 nanometer increase in the distance the head is positioned away from the surface of the disk to reflect that fact that the head flies closer to the surface of the disk at sea-level than at an altitude of 3300 meters.

Differential pressure data and/or atmospheric pressure data may also be stored directly within the hard disk drive on "reserved" tracks of the HDD. Typically, these reserved tracks are only accessible by the HDD operating system and not by the user.

In an embodiment, HDD 100 comprises a risk assessment component (not depicted) capable of determining an expression of how likely it is that HDD 100 will experience an imminent error in operation based, at least in part, upon the difference in pressure measured by the differential pressure sensor. As shall be explained in additional detail below, the risk assessment component may also consider other factors, such as how many airborne particles or how much undesirable chemical vapors are within the interior of the enclosure of HDD 100, in determining how likely it is that HDD 100 will experience an imminent error.

The risk assessment component is also configured to communicate, to a user of HDD 100, how likely it is that HDD 100 will experience an imminent error in operation based upon the difference in pressure measured by the differential pressure sensor. Additional details about how the risk is communicated to the user shall be provided in the section entitled "Communicating the Risk Assessment to a User."

Having described an illustrative description of a hard-disk drive (HDD) according to an embodiment of the invention, the process of detecting a leak within the enclosure of the HDD shall now be presented in greater detail.

Detecting a Leak within the Enclosure of an HDD

Figure 3A:
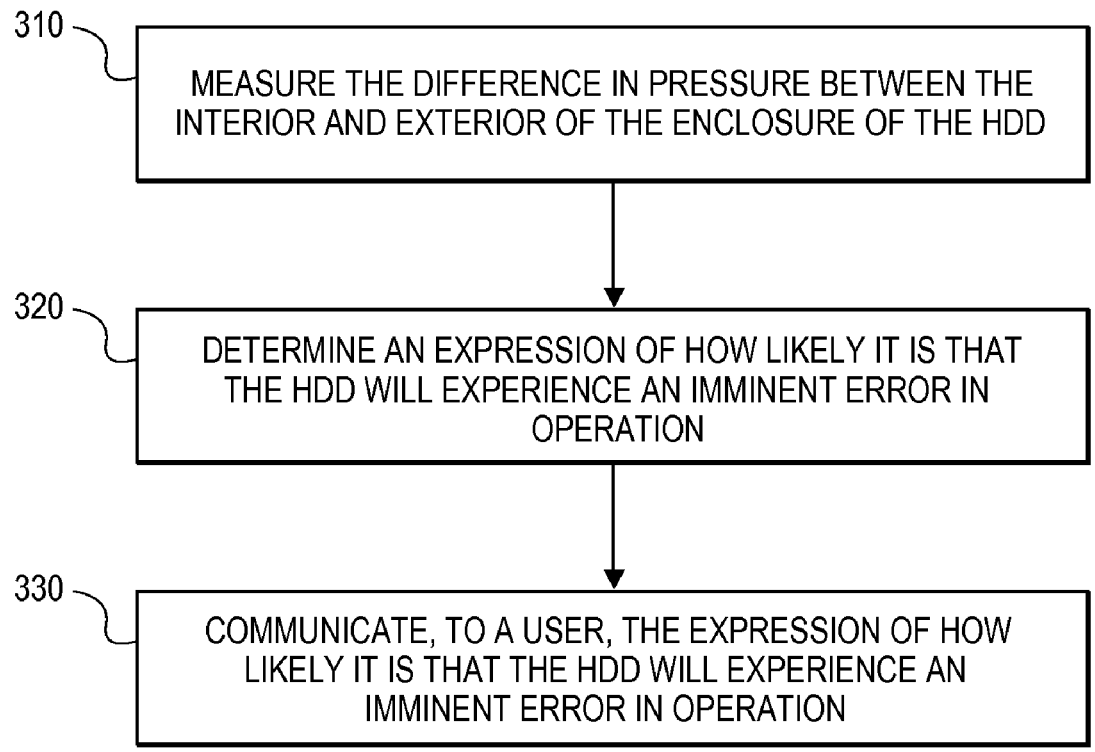
FIG. 3A is a flowchart depicting the functional steps involved in predicting operational problems in an HDD according to an embodiment of the invention.

FIG. 3A is a flowchart 300 depicting the functional steps involved in predicting operational problems in an HDD according to an embodiment of the invention. Embodiments of the invention predict operational problems by detecting a leak within the enclosure of the HDD and assessing the severity of a detected leak. Embodiments assess a more severe leak within the enclosure of an HDD to pose a more significant risk of an imminent operational problem than a less severe leak. This is so because as the severity of the leak increases, the number of harmful airborne particles that have likely been introduced into the interior of the enclosure of the HDD also increases.

Initially, in step 310, the difference in pressure between the interior of the enclosure of the HDD and the exterior of the HDD is measured. Step 310 may be performed by the differential pressure sensor. In an embodiment, the differential pressure sensor may be located within the breather filter.

The differential pressure sensor may store differential pressure data that describes changes, over a period of time, in the difference in pressure between the interior of the enclosure of HDD 100 and the exterior of the enclosure of HDD 100. Alternately, the differential pressure sensor may not record any historical data about the difference in pressure between the interior and exterior of the enclosure of HDD 100, but instead, may only maintain the current difference in pressure between the interior and exterior of the enclosure of HDD 100.

In step 320, the risk assessment component determines an expression (denoted an "expression of risk") of how likely it is that HDD 100 will experience an imminent error in operation. The expression of risk may correspond to any description, label, string, or identifier that characterizes how likely it is that HDD 100 will soon experience an error in operation, such as a hard or soft error. For example, the expression of risk may correspond to an error warning (such as "Caution: Hard Drive Enclosure Breached—Please Service Hard Drive Immediately") or a percent chance that HDD 100 will soon experience an error. Additional details about the expression of risk are discussed below in the section entitled "Characterizing the Risk."

The risk assessment component may determine the expression of risk in step 320 in response to the occurrence of a particular event or condition. For example, step 320 may be performed each time HDD is powered on or when the risk assessment component determines that the difference in pressure between the interior and exterior of the enclosure of HDD 100 is greater than a particular threshold value. Additional details about when step 320 may be performed are provided in the section below entitled "When to Determine the Expression of Risk."

Further, the risk assessment component may consider other factors besides the difference in pressure between the interior and exterior of the enclosure of HDD 100 in determining the expression of risk (such as, for example, whether the head has recently been loaded or unloaded, whether HDD 100 recently experienced a mechanical shock, the current altitude of HDD 100, the current temperature of HDD 100, the current number of airborne particles within HDD 100, and whether chemical vapor has been introduced within the interior of HDD 100), as elaborated in further detail below in the section entitled "Additional Factors to Consider When Determining the Expression of Risk."

In an embodiment, the risk assessment component may determine the expression of risk based on historical data describing the operating conditions of the HDD 100 for a certain period of time. For example, the risk assessment component may consider differential pressure data recorded by the pressure sensor in determining the expression of risk. Differential pressure data is data that describes, for a period of time, the difference in pressure between the interior and exterior of the enclosure of HDD 100. In this way, the risk assessment component may consider, not just the current pressure difference, but the pressure difference between the interior and exterior of the enclosure of HDD 100 that existed over an extended period of time. As another example, in addition to the pressure data, the risk assessment component may consider particle data that describes how many airborne particles have entered the interior of the enclosure of the HDD 100 since the time of manufacture of HDD 100. Thus, the risk assessment component may consider characteristics of HDD 100 over an extended period of time in determining the expression of risk.

Alternately, in an embodiment, the risk assessment component may determine the expression of risk based solely on the current operating conditions of the HDD 100.

After the expression of risk has been determined, in step 330, the risk assessment component communicates, to a user of HDD 100, the expression of risk, i.e., how likely it is that HDD 100 will experience an imminent error in operation. In an embodiment, step 330 may be performed immediately after each performance of step 320. In another embodiment, step 330 may be performed only in response to certain conditions or events, such as HDD 100 being powered on, HDD 100 experiencing a bump or shock, moving HDD 100 to a particular altitude, or after the expiration of configurable amount of time.

The risk assessment component may be configured to communicate, to the user of HDD 100, the expression of risk in response to determining that the difference in pressure between the exterior and interior of the enclosure of HDD 100 is greater than a threshold value. In this way, if the difference in pressure is of such a magnitude as to indicate a very sizable leak, then user may be immediately notified that HDD 100 has a large leak within the enclosure of HDD 100 so that the user may take immediate action.

The expression of risk may be communicated to the user in a variety of different ways. For example, the risk assessment component may use S.M.A.R.T. technology (Self-Monitoring, Analysis and Reporting Technology) to display a message, containing the expression of risk, to the user on a display coupled to a machine comprising HDD 100 each time HDD 100 is powered on. Additional details about communicating the expression of risk to the user are provided in the section below entitled "Communicating the Risk Assessment to a User."

In an embodiment, the information obtained in step 330 may be used in the manufacturing process. During the manufacturing process, HDD 100 may be subjected to various performance tests to ensure operability of HDD 100. For example, HDD 100 may undergo a series of tests to determine whether HDD 100 will encounter a hard disk crash or other such operability problem. If HDD 100 does not pass such a test, then the information obtained in step 330 may be useful in diagnosing the problem. If it can be determined using the information obtained in step 330 that an operability problem was caused due to a leak in the enclosure of HDD 100, then the source of the leak can easily be addressed (for example, a screw or seal may be repaired or replaced) without requiring other portions of HDD 100 (such as the heads or magnetic-recording disk) to be replaced.

Additional Factors to Consider when Determining the Expression of Risk

Figure 3B:
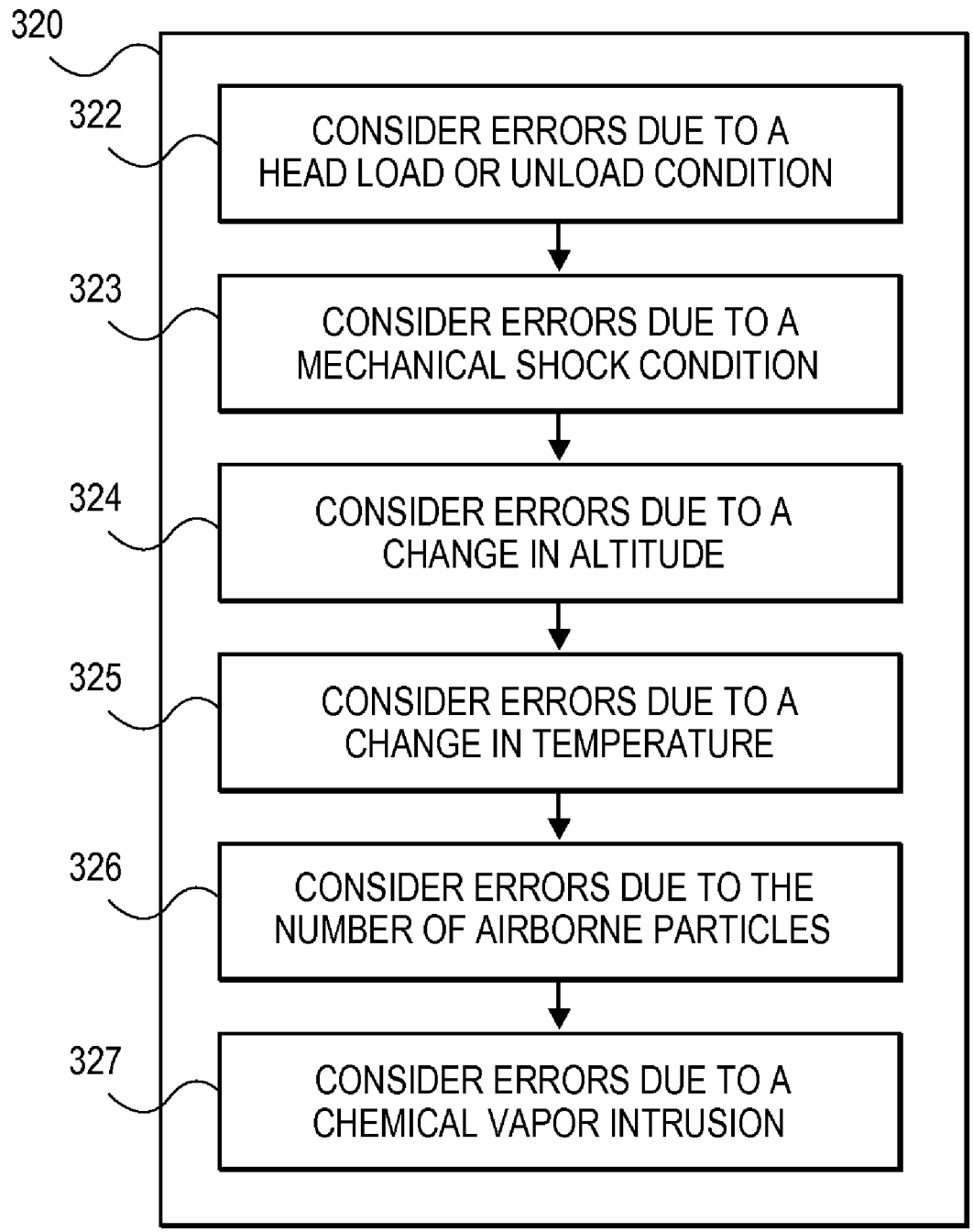
FIG. 3B is a flowchart depicting additional factors to consider when determining the expression of risk according to an embodiment of the invention.

FIG. 3B is a flowchart 350 depicting additional factors that certain embodiments of the invention consider when determining the expression of risk in performing step 320 of FIG. 3A. Note that while the factors depicted in flowchart 350 are depicted as being considered in a particular order, other embodiments of the invention may consider the factors depicted in FIG. 3B in a different order, including considering two or more factors in parallel. Further, each factor depicted in FIG. 3B is optional and need not be considered, as embodiments of the invention may be configured not to consider one or more factors depicted in FIG. 3B.

In factor 322, the risk assessment component considers whether a read/write head of HDD 100 has been, or will be, unloaded off of or loaded onto the ramp in determining the expression of risk in step 320. A read/write head of HDD 100 may periodically be loaded on the ramp and off the disk as a safety measure and to conserve power. When the read/write head loaded on the ramp and off the disk, the disks are still powered on and remain spinning. It may be advantageous, in performing step 320, to consider whether the head has been, or will soon be, loaded or unload off the ramp because HDD 100 may be more susceptible to encountering an error when the head is moved on and off the ramp.

In factor 323, the risk assessment component considers whether HDD 100 has recently encountered a mechanical shock in determining the expression of risk in step 320. When HDD 100 experiences a mechanical shock, the screws of HDD 100 may become compromised. Thus, the greater the magnitude of the mechanical shock, the greater the risk that an inadvertent leak may have been introduced into HDD 100. Thus, in performing step 320, certain embodiments consider whether HDD 100 has received a mechanical shock, and the magnitude of any such mechanical shock, in determining the expression of risk in step 320.

In factor 324, the risk assessment component considers the current altitude of HDD 100 in determining the expression of risk in step 320. The heads of HDD 100 fly closer to the disk as the altitude at which HDD 100 is located increases; consequently, when HDD 100 is at a high altitude, the tolerance for leaks or too many airborne particles within the enclosure of HDD 100 is less than when HDD 100 is at sea level. The decrease in tolerance for leaks or airborne particles is due to the heads flying closer to the disk (i.e., a reduction of head/disk clearance) as well as the heads being more susceptible to any airborne particles that penetrate the drive. Thus, in performing step 320, certain embodiments consider the current altitude of HDD 100 in determining the expression of risk in step 320, as the higher the altitude of HDD 100, the lower the tolerance is for leaks and airborne particles (due to reduction in head/disk clearance) within the enclosure of HDD 100 before an error in operation is encountered.

In factor 325, the risk assessment component considers the current temperature of HDD 100 in determining the expression of risk in step 320. Temperature affects the distance between the heads and the surface of the magnetic-recording disk as the heads of HDD 100 fly as the magnetic-recording disk. In addition, an increase in the temperature of HDD 100 may cause any leaks or holes within the enclosure of HDD 100 to expand. If the leakage increases due to temperature, then the susceptibility of HDD 100 to airborne particles entering the interior of HDD 100 also increases. Thus, in performing step 320, certain embodiments consider the current temperature of HDD 100 in determining the expression of risk in step 320, as the current temperature of HDD 100 affects the tolerance for leaks and airborne particles within the enclosure of HDD 100 before an error in operation is encountered.

In factor 326, the risk assessment component considers the number of airborne particles in determining the expression of risk in step 320. Additional details about the risk assessment component considering the number of airborne particles within the interior of the enclosure in determining the expression of risk in step 320 is provided below in the section entitled "Counting Airborne Particles within the Interior of the HDD Enclosure."

In factor 327, the risk assessment component considers the amount of chemical vapor intrusion in determining the expression of risk in step 320. Additional details about the risk assessment component considering the amount of chemical vapor intrusion within the interior of the enclosure in determining the expression of risk in step 320 is provided below in the section entitled "Detecting Chemical Vapors within the Interior of the HDD."

Counting Airborne Particles within the Interior of the HDD Enclosure

In an embodiment, HDD 100 includes a particle counter capable of determining the number of airborne particles within the interior of the enclosure of HDD 100. In such an embodiment, the risk assessment component may additionally consider the number of airborne particles within the interior of the enclosure in determining the expression of risk. The particle counter may be located in any location within the interior of HDD 100 which enables the particle counter to assess the airborne particles within the interior of HDD 100, e.g., the particle counter may be located anywhere on the cover of the base casting of HDD 100.

The particle counter may also be capable of determining the shape and size of the airborne particles within the interior of the enclosure of HDD 100. The particle counter may record data (denoted "particle data") describing the number, shape, and/or size of the airborne particles within the interior of the enclosure of HDD 100 over a period of time. Particle data describing the size, shape, or nature of airborne particles within the interior of the enclosure of HDD 100 may be useful, to the manufacturer of HDD 100, in diagnosing a problem with HDD 100.

In an embodiment, the particle counter may continuously record particle data about the number, shape, and/or size of airborne particles and chemical vapors within the interior of the enclosure of HDD 100. Alternately, in an embodiment, the particle counter may determine the number, shape, and/or size of airborne particles within the interior of the enclosure of HDD 100 in response to the pressure sensor determining that the difference in pressure between the interior of the enclosure and the exterior of the enclosure pressure is greater than a certain threshold.

In an embodiment, the number of airborne particles within the enclosure of HDD 100 may be used by the risk assessment component in determining the expression of risk in step 320. Hard-disk drives can typically operate without encountering any problems with a small amount of airborne particles. However, if the particle counter determines that the number of airborne particles within the interior of the enclosure of HDD 100 has increased from 100 to 200, then the risk assessment component may determine in step 320 the expression of risk should equate to a cautionary warning. On the other hand, if the particle counter determines that the number of airborne particles within the interior of the enclosure of HDD 100 has increased from 100 to 20,000, then the risk assessment component may determine in step 320 the expression of risk should identify that an operational failure of HDD 100 is imminent. The manufacture of HDD 100 may configure the behavior of the risk assessment component with respect to how many airborne particles are required to be present within the interior of the enclosure of HDD 100 before the risk assessment component performs a certain action, such as determining a particular expression of risk.

In an embodiment, the risk assessment component, in performing step 230, may consider one or more of differential pressure data, atmospheric pressure data, and particle data in determining the expression of risk. In an approach, if either the differential pressure data indicates the difference in pressure exceeds a particular threshold associated with an error condition or the particle data indicates the number of particles in the interior of the enclosure exceeds a particle threshold associated with an error condition, then the risk assessment component may select a particular expression of risk that indicates that there is a problem with HDD 100 and an error may be imminent. In an another approach, if the atmospheric pressure data indicates that a change in altitude greater than a particular threshold has occurred, then HDD 100 may take appropriate action to compensate the TFC (Thermal Flying Height Control) settings of each head in HDD 100 to reflect a positive or negative change in head/disk separation due to the change in altitude.

Detecting Chemical Vapors within the Interior of the HDD

In an embodiment, HDD 100 may comprise a chemical vapor sensor. A chemical vapor sensor is a component that is capable of determining the vapor concentration within the interior of the enclosure of a hard-disk drive, such as HDD 100. The chemical vapor sensor may be located in any location within the interior of HDD 100 which enables the chemical vapor sensor to assess the vapor concentration within the interior of HDD 100, e.g., the chemical vapor sensor may be located anywhere on the cover of the base casting of HDD 100.

Harmful chemical vapors entering into the interior of HDD 100 are evidence that the enclosure of HDD 100 has a leak. Non-limiting, illustrative examples of harmful chemical vapors include hydrocarbon based vapor, such as methane vapor, gasoline vapor as well as siloxane (poly-dimethylsiloxane) vapor.

In such an embodiment, the risk assessment component may be configured to determine the expression of how likely it is that the hard-disk drive (such as HDD 100) will experience an imminent error in operation based upon the chemical vapor concentration determined by the chemical vapor sensor. For example, the risk assessment component may determine that it is likely that HDD 100 will experience an imminent error in operation if the chemical vapor concentration in the interior of HDD 100 exceeds a particular threshold. In performing step 320, the risk assessment component may determine the expression of risk based upon data or input received from one or more of the differential pressure sensor, the atmospheric pressure sensor, the particle counter, and the chemical vapor sensor.

Pressure Sensor Battery

In an embodiment, the differential pressure sensor, the atmospheric pressure sensor, the particle counter, and/or the chemical vapor sensor may be coupled to a battery so that the differential pressure sensor, the atmospheric pressure sensor, the particle counter, and/or the chemical vapor sensor may continue to operate for a period of time after HDD 100 is powered down. A rechargeable battery using the "flexible film" technology with Lithium-Ion type batteries may be used. In this way, the differential pressure sensor, the atmospheric pressure sensor, the particle counter, and/or the chemical vapor sensor may continue to monitor characteristics of the enclosure of HDD 100 during the time when, after HDD 100 is powered down, the air within the enclosure stops circulating and the temperature within the enclosure decreases to room temperature.

The battery coupled to a differential pressure sensor, the atmospheric pressure sensor, the particle counter, and/or the chemical vapor sensor may be placed anywhere in the interior of HDD 100. It would be advantageous to use a battery that is as inexpensive as possible, as the cost of the battery will add to the production cost of HDD 100. In an embodiment, the battery may be a relatively small battery, similar to a hearing aid battery.

In an embodiment, the battery coupled to the differential pressure sensor, the atmospheric pressure sensor, a particle counter, and/or a chemical vapor sensor may be selected such that it could be used for many years. When the power remaining in the battery is low (or out), the user may receive a notification that the battery is low or needs replaced. This notification may be performed using S.M.A.R.T. technology, which is explained in further detail below.

In an embodiment, the differential pressure sensor, the atmospheric pressure sensor, the particle counter, and/or the chemical vapor sensor is coupled to a rechargeable battery. When HDD 100 is powered on, the power to HDD 100 may be used to charge the rechargeable battery.

In another embodiment, the differential pressure sensor, the atmospheric pressure sensor, the particle counter, and/or the chemical vapor sensor is coupled to a replaceable battery. In such an embodiment, HDD 100 may contain a receptacle to removably attach the replaceable battery to HDD 100 without exposing the interior of the enclosure of HDD 100 to the exterior of the enclosure of HDD 100.

Characterizing the Risk

The expression of risk may be implemented in a number of different ways. In an embodiment, the expression of risk may correspond to a particular risk level of a bounded sequence of risk levels. The bounded sequence of risk levels may be arranged in order of how likely it is that HDD 100 will experience an imminent error in operation. For example, the lowest risk level in the bounded sequence may correspond to little or no risk, the next risk level in the bounded sequence may correspond to a small amount of risk, the next risk level in the bounded sequence may correspond to a great amount of risk, and the last risk level in the bounded sequence may correspond to an extreme amount of risk.

In another embodiment, the expression of risk may correspond to a percentage that indicates the probability that the hard-disk drive (HDD) will encounter an error in operation in the near future. For example, the expression of risk may be expressed as 0.5% (indicating a small amount of risk) or 80% (indicating a large amount of risk).

Embodiments of the invention may implement the expression of risk using an error code or other identifier. For example, if the difference in pressure between the exterior and interior of the enclosure of HDD 100 exceeds a certain threshold, then an error condition may result, and the expression of risk may correspond to the name of the error condition.

Certain embodiments of the invention may implement the expression of risk such that the expression of risk includes certain data describe the risk conditions. For example, the expression of risk may identify the difference in the pressure between the exterior and interior of the enclosure of HDD 100 or identify the number of airborne particles that have entered the interior of the enclosure of HDD 100 since the time of manufacture of HDD 100.

When to Determine the Expression of Risk

In performing step 320, the risk assessment component determines an expression of risk that characterizes the likelihood that HDD 100 may experience on imminent error in operation. Embodiments of the invention may perform step 320 in response to various events. In an embodiment, the risk assessment component performs step 320 in response to HDD 100 being powered on. In other embodiments, the risk assessment component may perform step 320 in response to HDD 100 being idle or otherwise not reading or writing data.

In other embodiments, the risk assessment component may perform step 320 in response to the read/write head being loaded on the ramp and off the disk. A read/write head may periodically be loaded on the ramp and off the disk as a safety measure and to conserve power. When the read/write head loaded on the ramp and off the disk, the disks are still powered on and remain spinning. In other embodiments, the risk assessment component may perform step 320 in response to the read/write head being loaded onto the disk.

In other embodiments, the risk assessment component may perform step 320 in response to HDD 100 receiving a mechanical shock greater than a certain magnitude. It may be advantageous to perform step 320 after HDD 100 receives a mechanical shock because the screws can become compromised. Thus, in an embodiment, HDD 100 comprises a shock detector, which is a component that is capable of detecting that HDD experienced a mechanical shock. In this embodiment, the risk assessment component is configured to perform step 320 in response to the shock detector determining that HDD 100 has experienced a mechanical shock greater than a particular threshold or magnitude.

In other embodiments, the risk assessment component may perform step 320 in response to HDD 100 being at or above a particular altitude. The atmospheric pressure sensor can determine the change in altitude. It may be advantageous to perform step 320 if HDD 100 is at or above a particular altitude because the heads fly closer to the disk when HDD 100 is at high altitude; consequently, when HDD 100 is at a high altitude, the tolerance for leaks or too many airborne particles within the enclosure of HDD 100 is less than when HDD 100 is at sea level. For example, when HDD 100 is at sea level, there may be about 6 nanometers of clearance between a read/write head and the disk; on the other hand, when HDD 100 is at a high altitude, the read/write head may fly over the disk with only about 4 nanometers of clearance. Thus, in an embodiment, HDD 100 also comprises an absolute pressure sensor, which is a component that is capable of identifying the current altitude of HDD 100. In this embodiment, the risk assessment component is configured to perform step 320 in response to the atmospheric pressure sensor determining that HDD 100 is at or above a particular altitude.

In other embodiments, the risk assessment component may perform step 320 in response to HDD 100 being at or above a particular temperature, as environmental temperature changes within HDD 100 may affect the distance between the read/write head of HDD 100 and the surface of the magnetic-recording disk. In an embodiment, HDD 100 comprises a temperature sensor, which is a component that is capable of determining the temperature within the interior of the enclosure of HDD 100. In such an embodiment, the risk assessment component is configured to perform step 320 in response to the temperature sensor determining that the temperature within the interior of the enclosure of the hard-disk drive (HDD) is greater than a particular threshold or temperature.

In other embodiments, the risk assessment comprises a chemical sensor. In such an embodiment, the risk assessment component is configured to perform step 320e in response to a chemical vapor intrusion inside the drive. This determination is obtained via the chemical vapor sensor that detects a hydrocarbon vapor or siloxane (poly-dimethylsiloxane) vapor above a threshold amount.

Communicating the Risk Assessment to a User

In step 330, the risk assessment component communicates the expression of risk to the user of HDD 100. In an embodiment, the expression of risk may be communicated to the user using S.M.A.R.T. technology. S.M.A.R.T. (Self-Monitoring, Analysis and Reporting Technology) technology is implemented into virtually all modern hard disks. A special program inside the hard-disk drive employing S.M.A.R.T. technology constantly monitors the condition of a variety of attributes of the hard-disk drive, such as the driver, the disk heads, the surface state, and the electronics. The S.M.A.R.T. technology monitors the hard-disk drive for anything that might seem out of the ordinary, documents it, and analyzes the data. If the S.M.A.R.T. technology detects a condition that indicates a problem, the S.M.A.R.T. technology is capable of notifying the user (or system administrator).

In an embodiment, step 330 may be performed by using S.M.A.R.T. technology to notify the user of HDD 100 of the expression of risk. Typically, S.M.A.R.T. technology communicates information to the user by displaying a message on a display coupled to a machine comprising the hard-disk drive each time the hard-disk drive is powered on. Alternately, in an embodiment, a software program executing on a computer could communicate with the S.M.A.R.T. technology and/or the risk assessment component to retrieve the assessment of risk for display to the user.

Atmospheric Pressure Sensor

Figure 9:
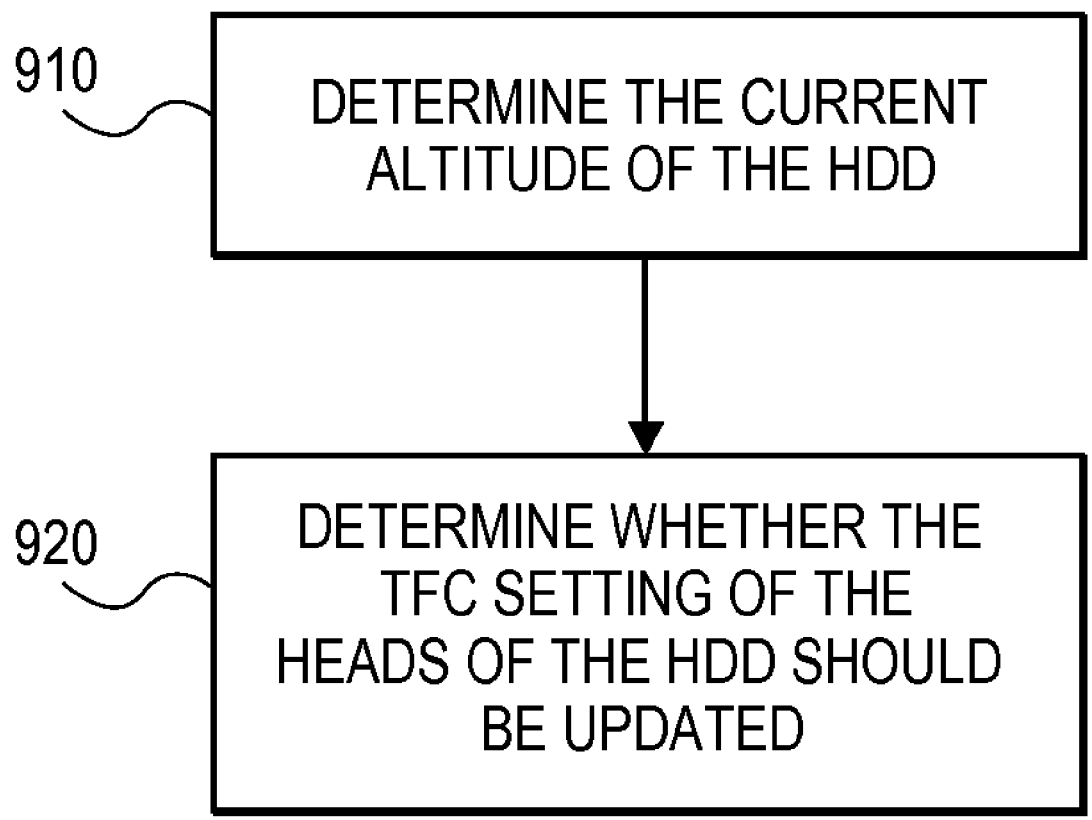
FIG. 9 is a flowchart depicting the functional steps of correcting the distance between the heads of an HDD and the disk in response to a change in altitude of the HDD according to an embodiment of the invention.

FIG. 9 is a flowchart depicting the functional steps of correcting the distance between the heads of an HDD and the disk in response to a change in altitude of the HDD according to an embodiment of the invention. By performing the steps of FIG. 9, HDD 100 may adjust the Thermal Fly Height Control (TFC) settings of the heads to reflect a change in altitude. Normally, the TFC settings allow a head to drop about 4 nanometers closer to the surface of the magnetic-recording disk to allow the read/write heads to fly over the surface of the magnetic-recording disk in close proximity to the surface of the magnetic-recording disk.

In step 910, the current altitude of HDD 100 is determined by the atmospheric pressure sensor. The atmospheric pressure sensor may record atmospheric pressure data that identifies the altitude of which HDD 100 was located at different points in time. Alternatively, the atmospheric pressure data may only identify the current altitude of HDD 100 without describing a historical record of the altitude of HDD 100.

In step 920, a determination is made as to whether the TFC settings of the heads of HDD 100 should be updated to reflect the current altitude of HDD 100. The heads of HDD 100 typically fly over the surface of the magnetic-recording disk with 10 nanometers clearance when HDD 100 is at sea level. However, when HDD 100 is located at an altitude of 3300 meters, the heads typically fly over the surface of the magnetic-recording disk with only 8 nanometers clearance, which is 2 nanometers less than when HDD 100 is located at sea level.

Thus, in an embodiment, when HDD 100 determines that HDD 100 is located at an altitude greater than a particular level, then an electronic component of HDD 100 adjusts the TFC settings of the heads of HDD 100, as the heads will fly closer to the surface of the magnetic-recording disk at elevation. In the example above, in the performance of step 920, the TFC settings for the heads of HDD 100 will be adjusted to undergo a −2 nanometer change, if HDD 100 has been brought from sea level to an altitude of 3300 meters, as the heads of HDD 100 fly 2 nanometers closer to the surface of the disk at 3300 meters compared to sea level. As the heads fly closer to the surface of the magnetic-recording disk at altitude (in this example 3300 meters), it is not necessary for the TFC settings to drop the head closer to the surface of the magnetic-recording disk by 4 nanometers, as dropping the head by only 2 nanometers positions the head over the surface of the magnetic-recording disk the same distance away from the surface of the magnetic-recording disk as when HDD 100 is at sea level.

In an embodiment (denoted the "single sensor embodiment"), the atmospheric pressure sensor may be implemented using the same pressure sensor as the differential pressure sensor. Thus, embodiments of the invention may employ a single pressure sensor to perform the functions described herein attributed to both the differential pressure sensor and the atmospheric pressure sensor. In such an embodiment, an electronic control of HDD 100 may instruct the pressure sensor to operate as either a differential pressure sensor as described herein or an atmospheric pressure sensor as described herein.

According to one approach for implementing the single sensor embodiment, when HDD 100 is initially powered on, an electronic control of HDD 100 instructs the single pressure sensor to function as a differential pressure sensor to determine whether there is a leak within the enclosure of HDD 100. Thereafter, the electronic control of HDD 100 instructs the single pressure sensor to function as an atmospheric pressure sensor to determine if present elevation of HDD 100 has changed since HDD 100 was last powered on. If HDD 100 detects a leak within the enclosure of HDD 100, then HDD 100 warns the user of the leak via the S.M.A.R.T. interface. Contemporaneously, if HDD 100 determines that the change in elevation of HDD 100 since the last time HDD 100 was powered on is greater than a particular threshold, then HDD 100 adjusts the TFC settings of the heads so that they fly with the proper clearance over the surface of the magnetic-recording disk despite the current altitude of HDD 100. The user of HDD 100 may be informed of any change to the TFC settings via the S.M.A.R.T. interface.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard-disk drive (HDD), comprising:
    an enclosure, wherein the enclosure contains an air passage that allows air to flow between the interior of the enclosure and the exterior of the enclosure, wherein the air passage is covered by a breather filter;
    a differential pressure sensor capable of measuring a difference in pressure between the interior of the enclosure and the exterior of the enclosure;
    a risk assessment component capable of determining an expression of how likely it is that the hard-disk drive (HDD) will experience an imminent error in operation based, at least in part, upon the difference in pressure measured by the differential pressure sensor, wherein the risk assessment component is configured to communicate, to a user of the hard-disk drive (HDD), the expression of how likely it is that the hard-disk drive (HDD) will experience an imminent error in operation based, at least in part, upon the difference in pressure measured by the differential pressure sensor;
    a magnetic-recording head;
    a magnetic-recording disk rotatably mounted on a spindle;
    a drive motor mounted in said enclosure, said drive motor having a motor shaft attached to said spindle for rotating said magnetic-recording disk; and
    a voice-coil motor configured to move said magnetic-recording head to access portions of said magnetic-recording disk.

2. The hard-disk drive (HDD) of claim 1, wherein the differential pressure sensor is located in the air passage covered by the breather filter.

3. The hard-disk drive (HDD) of claim 1, wherein the differential pressure sensor stores differential pressure data that describes changes, over a period of time, in the difference in pressure between the interior of the enclosure and the exterior of the enclosure, and wherein the risk assessment component determines the expression of how likely it is that the hard-disk drive (HDD) will experience an imminent error in operation using the differential pressure data.

4. The hard-disk drive (HDD) of claim 3, further comprising:
    flash memory within the interior of the enclosure of the hard-disk drive (HDD), and wherein the differential pressure data is stored in the flash memory.

5. The hard-disk drive (HDD) of claim 1, wherein the differential pressure sensor is capable of operating as an atmospheric pressure sensor that identifies the current altitude of the hard-disk drive (HDD), and wherein the risk assessment component is configured to determine the expression based upon the current altitude of the hard-disk drive (HDD).

6. The hard-disk drive (HDD) of claim 1, further comprising:
    a shock detector, wherein the shock detector is a component that is capable of detecting that the hard-disk drive (HDD) experienced a mechanical shock, and wherein the risk assessment component is configured to determine the expression of how likely it is that the hard-disk drive (HDD) will experience an imminent error in operation upon the shock detector determining that the hard-disk drive (HDD) has experienced a mechanical shock greater than a particular threshold.

7. The hard-disk drive (HDD) of claim 1, further comprising:
    a temperature sensor, wherein the temperature sensor is a component that is capable of determining the temperature within the interior of the enclosure of the hard-disk drive (HDD), and wherein the risk assessment component is configured to determine the expression of how likely it is that the hard-disk drive (HDD) will experience an imminent error in operation upon the temperature sensor determining that the temperature within the interior of the enclosure of the hard-disk drive (HDD) is greater than a particular threshold.

8. The hard-disk drive of claim 1, further comprising:
a chemical vapor sensor, wherein the chemical vapor sensor is a component that is capable of determining the chemical vapor concentration within the interior of the enclosure of the hard-disk drive (HDD), and wherein the risk assessment component is configured to determine the expression of how likely it is that the hard-disk drive (HDD) will experience an imminent error in operation based upon the chemical vapor concentration within the interior of the hard-disk drive (HDD).

9. The hard-disk drive (HDD) of claim 1, wherein the differential pressure sensor is coupled to a rechargeable battery, and wherein the differential pressure sensor uses power supplied by the rechargeable battery to measure the difference in the pressure between the interior of the enclosure and the exterior of the enclosure for a length of time after the hard-disk drive (HDD) is no longer being supplied power.

10. The hard-disk drive (HDD) of claim 1, wherein the differential pressure sensor is coupled to a replaceable battery, and wherein the hard-disk drive (HDD) contains a receptacle to removably attach the replaceable battery to the hard-disk drive (HDD) without exposing the interior of the enclosure to the exterior of the enclosure.

11. The hard-disk drive (HDD) of claim 1, wherein the risk assessment component is configured to communicate, to the user, the expression in response to the hard-disk drive (HDD) being powered on.

12. The hard-disk drive (HDD) of claim 1, further comprising:
a particle counter capable of determining the number of airborne particles within the interior of the enclosure of the hard-disk drive (HDD),
wherein the risk assessment component additionally considers the number of airborne particles within the interior of the enclosure in determining the expression of how likely it is that the hard-disk drive (HDD) will experience an imminent error in operation.

13. The hard-disk drive (HDD) of claim 12, wherein the particle counter is capable of determining a shape and size of the airborne particles within the interior of the enclosure of the hard-disk drive (HDD), and wherein the particle counter records data describing the number, shape, and size of the airborne particles over a period of time.

14. The hard-disk drive (HDD) of claim 12, wherein the particle counter determines the number of airborne particles within the interior of the enclosure of the hard-disk drive (HDD) upon the differential pressure sensor determining that the difference in pressure between the interior of the enclosure and the exterior of the enclosure pressure is greater than a certain threshold.

15. The hard-disk drive (HDD) of claim 1, wherein the expression may correspond to a particular risk level of a bounded sequence of risk levels, and wherein a first risk level that is higher in the bounded sequence of risk levels is associated with more risk of an error in operation than a second risk level that is lower in the bounded sequence of risk levels.

16. The hard-disk drive (HDD) of claim 1, wherein the expression corresponds to a percentage that indicates the probability that the hard-disk drive (HDD) will encounter an error in operation in the near future.

17. The hard-disk drive (HDD) of claim 1, wherein the risk assessment component is configured to communicate, to the user of the hard-disk drive (HDD), that the hard-disk drive (HDD) is likely to experience imminent failure upon determining that the difference in pressure is greater than a threshold value.

18. The hard-disk drive (HDD) of claim 1, wherein the differential pressure sensor has a structure that allows the differential pressure sensor to be located anywhere in a cover or a base casting of the hard-disk drive (HDD).

19. A hard-disk drive (HDD), comprising:
an enclosure, wherein the enclosure contains an air passage that allows air to flow between the interior of the enclosure and the exterior of the enclosure, wherein the air passage is covered by a breather filter;
a differential pressure sensor capable of measuring a difference in pressure between the interior of the enclosure and the exterior of the enclosure;
particle counter capable of determining the number of airborne particles within the interior of the enclosure of the hard-disk drive (HDD);
an error detection component capable of determining an expression of how likely it is that the hard-disk drive (HDD) will experience an imminent error in operation based, at least in part, upon the difference in pressure and the number of airborne particles within the interior of the enclosure;
a magnetic-recording head;
a magnetic-recording disk rotatably mounted on a spindle;
a drive motor mounted in said enclosure, said drive motor having a motor shaft attached to said spindle for rotating said magnetic-recording disk; and
a voice-coil motor configured to move said magnetic-recording head to access portions of said magnetic-recording disk.

20. The hard-disk drive (HDD) of claim 19, wherein the risk assessment component is configured to determine that the expression indicates that the hard-disk drive (HDD) will likely experience an imminent error in operation if (a) the difference in pressure is greater than a first threshold and (b) the number of airborne particles within the interior of the enclosure is greater than a second threshold.

21. The hard-disk drive (HDD) of claim 19, wherein the risk assessment component is configured to determine that the expression indicates that the hard-disk drive (HDD) will likely experience an imminent error in operation if (a) the difference in pressure is greater than a first threshold or (b) the number of airborne particles within the interior of the enclosure is greater than a second threshold.

22. A machine-implemented method for determining the likelihood that a hard-disk drive (HDD) will experience an imminent error in operation, comprising:
measuring a difference in pressure between an interior of an enclosure of the hard-disk drive (HDD) and an exterior of the enclosure of the hard-disk drive (HDD);
upon determining that the difference in pressure between the interior and the exterior of the enclosure of the hard-disk drive (HDD) is greater than a particular threshold, a risk assessment component determining that the hard-disk drive (HDD) is likely to experience an imminent error in operation; and
communicating, to a user of the hard-disk drive, that the hard-disk drive (HDD) is likely to experience an imminent error in operation.

* * * * *